(12) United States Patent
Erickson et al.

(10) Patent No.: US 6,954,929 B2
(45) Date of Patent: Oct. 11, 2005

(54) METHOD FOR JUST-IN-TIME UPDATING OF PROGRAMMING PARTS

(75) Inventors: Michael John Erickson, Loveland, CO (US); David R. Maciorowski, Parker, CO (US); Christopher S Kroeger, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 09/917,982

(22) Filed: Jul. 30, 2001

(65) Prior Publication Data

US 2003/0023962 A1 Jan. 30, 2003

(51) Int. Cl.[7] .............................................. G06F 9/44
(52) U.S. Cl. ..................... 717/173; 717/170; 710/220
(58) Field of Search .............................. 717/124–127, 717/168–178, 120–122; 702/117–123; 710/36–47, 109, 220, 72–74, 313–315; 716/15, 12–17; 703/21–22; 709/212–233, 311–312, 319–321, 324–327; 711/100–112; 713/1–2, 100

(56) References Cited

U.S. PATENT DOCUMENTS

| | | |
|---|---|---|
| 4,914,576 A | 4/1990 | Zelley et al. |
| 5,101,490 A | 3/1992 | Getson et al. |
| 5,343,478 A | 8/1994 | James et al. |
| 5,425,036 A | 6/1995 | Liu et al. |
| 5,428,800 A | 6/1995 | Hsieh et al. |
| 5,465,056 A | 11/1995 | Hsieh et al. |
| 5,477,544 A | 12/1995 | Botelho |
| 5,761,462 A | 6/1998 | Neal et al. |
| 5,802,268 A | 9/1998 | Fisher et al. |
| 5,826,048 A | 10/1998 | Dempsey et al. |
| 5,864,486 A | 1/1999 | Deming et al. |
| 5,894,571 A | 4/1999 | O'Connor |
| 5,933,614 A | 8/1999 | Tavallaei et al. |
| 5,935,233 A | 8/1999 | Jeddeloh |
| 5,970,005 A | 10/1999 | Yin et al. |

(Continued)

FOREIGN PATENT DOCUMENTS

| | | | | |
|---|---|---|---|---|
| EP | 1 043 656 A2 * | 10/2000 | ............. | G06F/9/44 |
| WO | WO 97/15011 A1 | 4/1997 | | |

OTHER PUBLICATIONS

Keahey, "Programming of Flash with ICT Rights and Responsibilities", IEEE, pp.: 711–717, 2000.*

XILINX: "XC18V00 Series Of In–System Programmable Configuration PROMs" Jun. 11, 2001.

Dehon, Andre, et al., "Reconfigurable Computing: What, Why And Implications For Design Automation," 1999, ACM Pres, p. 610–615.

Beer, Iian, et al., "Establishing PCI Compliance Using Formal Verification: A Case Study," Mar. 28–31, 1995, IEEE 14th Annual International Phoenix Conference on Computers And Communications, p. 373–377.

*Primary Examiner*—Ted T. Vo

(57) ABSTRACT

The invention provides a method of implementing firmware updates to programmable parts within circuit boards on a manufacturing line. An image file of firmware for each of the parts is created and stored on a firmware server. The programmable parts are preferably integrated with the printed circuit boards; each of the boards networks to the firmware server by connection with an interface server, such that the image files download to the circuit board for programming the board's internal programmable parts. Networking between the parts and the firmware server can include communications across the Internet and/or one or more area networks. Multiple interface servers may be integral with the products incorporating the programmable parts so that many products may be updated concurrently.

23 Claims, 2 Drawing Sheets

U.S. PATENT DOCUMENTS

| | | | |
|---|---|---|---|
| 6,031,391 A | | 2/2000 | Couts-Martin et al. |
| 6,044,025 A | | 3/2000 | Lawman |
| 6,055,632 A | * | 4/2000 | Deegan et al. .............. 713/100 |
| 6,137,738 A | | 10/2000 | Vorgert |
| 6,167,358 A | * | 12/2000 | Othmer et al. .............. 702/188 |
| 6,167,477 A | | 12/2000 | Garnett et al. |
| 6,198,303 B1 | | 3/2001 | Rangasayee |
| 6,255,849 B1 | | 7/2001 | Mohn |
| 6,289,406 B1 | | 9/2001 | Chambers |
| 6,314,550 B1 | | 11/2001 | Wang et al. |
| 6,366,973 B1 | | 4/2002 | Lo et al. |
| 6,401,153 B2 | | 6/2002 | Pawlowski |
| 6,405,276 B1 | | 6/2002 | Chen et al. |
| 6,425,094 B1 | | 7/2002 | Drogichen et al. |
| 6,427,198 B1 | | 7/2002 | Berglund et al. |
| 6,430,710 B1 | | 8/2002 | Moriyama et al. |
| 6,459,297 B1 | | 10/2002 | Smiley |
| 6,460,108 B1 | | 10/2002 | McCoskey et al. |
| 6,501,682 B2 | | 12/2002 | Yoshida |
| 6,526,332 B2 | | 2/2003 | Sakamoto et al. |
| 6,529,989 B1 | | 3/2003 | Bashford et al. |
| 6,553,439 B1 | | 4/2003 | Greger et al. |
| 6,567,414 B2 | | 5/2003 | Deng et al. |
| 6,614,259 B2 | | 9/2003 | Couts-Martin et al. |
| 6,622,206 B1 | | 9/2003 | Kanamau et al. |
| 6,622,246 B1 | * | 9/2003 | Biondi .............. 713/100 |
| 6,629,179 B1 | | 9/2003 | Bashford et al. |
| 6,636,927 B1 | | 10/2003 | Peters et al. |
| 6,651,225 B1 | | 11/2003 | Lin et al. |
| 6,658,508 B1 | | 12/2003 | Reiss et al. |
| 6,658,519 B1 | | 12/2003 | Broberg et al. |
| 6,684,362 B1 | | 1/2004 | Currier et al. |
| 6,691,205 B2 | | 2/2004 | Zilberman |
| 2002/0070753 A1 | | 6/2002 | Vogel et al. |
| 2002/0152421 A1 | | 10/2002 | Drogichen et al. |
| 2003/0005207 A1 | | 1/2003 | Langendorf et al. |
| 2003/0120974 A1 | | 6/2003 | Adams et al. |

* cited by examiner

METHOD FOR JUST-IN-TIME UPDATING OF PROGRAMMING PARTS

RELATED APPLICATIONS

This application is related to copending and cofiled applications for U.S. letters patent Ser. No. 09/918,030, filed Jul. 30, 2001 and entitled METHOD FOR ACCESSING SCAN CHAINS AND UPDATING EEPROM-RESIDENT FPGA CODE THROUGH A SYSTEM MANAGEMENT PROCESSOR AND JTAG BUS Ser. No. 09/918,023 filed Jul. 30, 2001 and entitled METHOD AND APPARATUS FOR IN-SYSTEM PROGRAMMING THROUGH A COMMON CONNECTION POINT OF PROGRAMMABLE LOGIC DEVICES ON MULTIPLE CIRCUIT BOARDS OF A SYSTEM; and Ser. No. 09/918,023, filed Jul. 30, 2001 and entitled SYSTEM AND METHOD FOR IN-SYSTEM PROGRAMMING THROUGH AN ON-SYSTEM JTAG BRIDGE OF PROGRAMMABLE LOGIC DEVICES ON MULTIPLE CIRCUIT BOARDS OF A SYSTEM, all of the aforementioned applications incorporated herewith by reference thereto.

BACKGROUND OF THE INVENTION

Many systems and products incorporate programmable parts, such as FPGAs, PLDs, EEPROMS and microprocessors. Often, the programming for these parts changes during the development stage, prototyping stage and even into the production stage. It is important and yet difficult to incorporate the latest programming into the parts at each stage, particularly in the advanced manufacturing stages when several entities may be involved.

In the manufacturing stage, for example, an outside contract vendor may program these parts for systems and products designed by the originating company; a contract manufacturer may perform the actual integrations of the parts within the systems and products, for sale under label of the originating company. The difficulties occur when the originating company identifies technical issues with firmware that must be changed and incorporated into the integration and/or manufacturing processes. The firmware changes must be communicated first to the contract vendor, and then physically integrated as a change into the parts integrations.

Implementing programming changes from the originating company and the contract vendor and manufacturer is thus tedious and difficult; and yet any delay in programming parts within these products and systems can cause critical program problems for the originating company. Likewise, an incorrect programming of parts with firmware that is not the latest revision can also cause critical program problems; systems and products may become inoperable in such instances.

There are two general methods for updating programming to programmable parts within such systems and products, and according to the prior art:
1. New program revisions are sent from the originating company to the contracting vendor. The vendor programs a few parts and sends them back to the originating company for verification. Once verified, the contract vendor is authorized to program the parts in larger quantities; the contract vendor then ships parts to the contract manufacturer, where programmed parts with older revisions are purged and the newer revision parts are integrated within the processes.

This method has several drawbacks. First, changes according to this method can take several weeks. Second, there is often considerable confusion about which revision should be implemented into the systems or products. Third, each company—the originating company, the contract vendor, and the contract manufacturer—typically expends significant overhead and resources in implementing and verifying the method. And fourth, manufacturing costs significantly increase when large quantities of programmed parts are purged to prepare for new revisions of these parts.
2. Parts are programmed in In-Circuit Test (ICT) An ICT generally consists of a "bed of nails" configuration to access signals on a circuit board. An ICT can be used to test boards, or components, but it may also be used to program parts. For example, certain pin configurations to a programmable part may be used to program the part; while other pin configurations to the programmable part may be used to test the part. There are several difficulties with the ICT: First, a long development time usually results from constructing an ICT. Second, the typical ICT cannot operate at high speeds, lengthening the time to program the part. Third, the use of an ICT is not generally scaleable to program many parts; the ICT then may become a bottleneck to efficient manufacturing and inventories.

It is, accordingly, one object of the invention to provide methods for programming of parts through a network. Other objects of the invention are apparent within the description that follows.

SUMMARY OF THE INVENTION

In one aspect, the invention provides a method of releasing new firmware updates to a programmable part within a circuit board. The method includes the steps of creating an image file of firmware used to program the part; storing the image file at a server; integrating the programmable part with the printed circuit board; and networking the circuit board to the server such that the image file downloads to the circuit board for programming the programmable part. The method may include the further step of automatically polling the server to download the firmware to the circuit board.

In one aspect, the method includes the step of integrating a serial chip with the printed circuit board, the serial chip polling the server to download the firmware, the programmable part having bootstrap software to download the firmware from the serial chip to the programmable part.

In one aspect, the method includes the step of utilizing the Internet in networking the circuit board with the server. A LAN or WAN may also be used in networking the circuit board with the server, alone or in combination with the Internet, to accomplish the steps of the invention.

In another aspect, the method includes the further step of updating the firmware image file at the server, subsequent downloads of the firmware image file to a programmable part being seamless to the updated firmware.

In another aspect, a system is provided for programming programmable parts in a manufacturing line. A firmware server connects to a network; the server storing a firmware image file. An interface server with the manufacturing line connects to the network and captures the image file from the firmware server. A first system with a first programmable part interfaces with the interface server to program the first programmable part with the firmware image file. A second system with a second programmable part then interfaces with the interface server to program the second programmable part with the firmware image file. Alternatively, each of the systems has an interface server for integrating with the firmware server; the interface servers each downloading firmware to programmable parts associated with its system. Preferably, the interface server includes a connector for physically coupling with a circuit board within the first and second systems, the first and second programmable parts being electronically and respectively coupled with the first and second printed circuit boards. The connector has one or more pins that interface in a programming configuration with pads or pins on the printed circuit boards to program the programmable parts. In the system, the image file may be updated or replaced with another image file without affecting interaction between the interface server and the system.

In still another aspect, the interface server has a connector with a plurality of pins for programming the part. The pins connect to the part, or to a connector of a printed circuit board housing the part, or to a system and signal lines coupled to the part, to program the part. The connector and pins may for example act similar to an ICT device.

In an alternative aspect, a system is provided for programming a series of programmable parts in a manufacturing line. A firmware server connects to a network; the server storing a firmware image file. An interface server connects to the network and captures the image file from the firmware server. Sequentially, one programmable part and then another interfaces with the interface server; the interface server programs each programmable part, in sequence, with the firmware image file. Preferably, the interface server includes a connector for physically coupling with pins of the programmable parts. The connector has one or more pins that interface in a programming configuration with the parts to facilitate programming the programmable parts.

In other aspects of the invention, multiple firmware image files are stored on a firmware server. Multiple interface servers connect in network with the firmware server to download one or more of the files to programmable parts associated with the interface servers. Typically, each of the interface servers resides within a product that includes at least one printed circuit board having the programmable parts; each of the servers downloading firmware for the programmable parts of that circuit board.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE PREFERRED EMBODIMENTS

Figure 1:
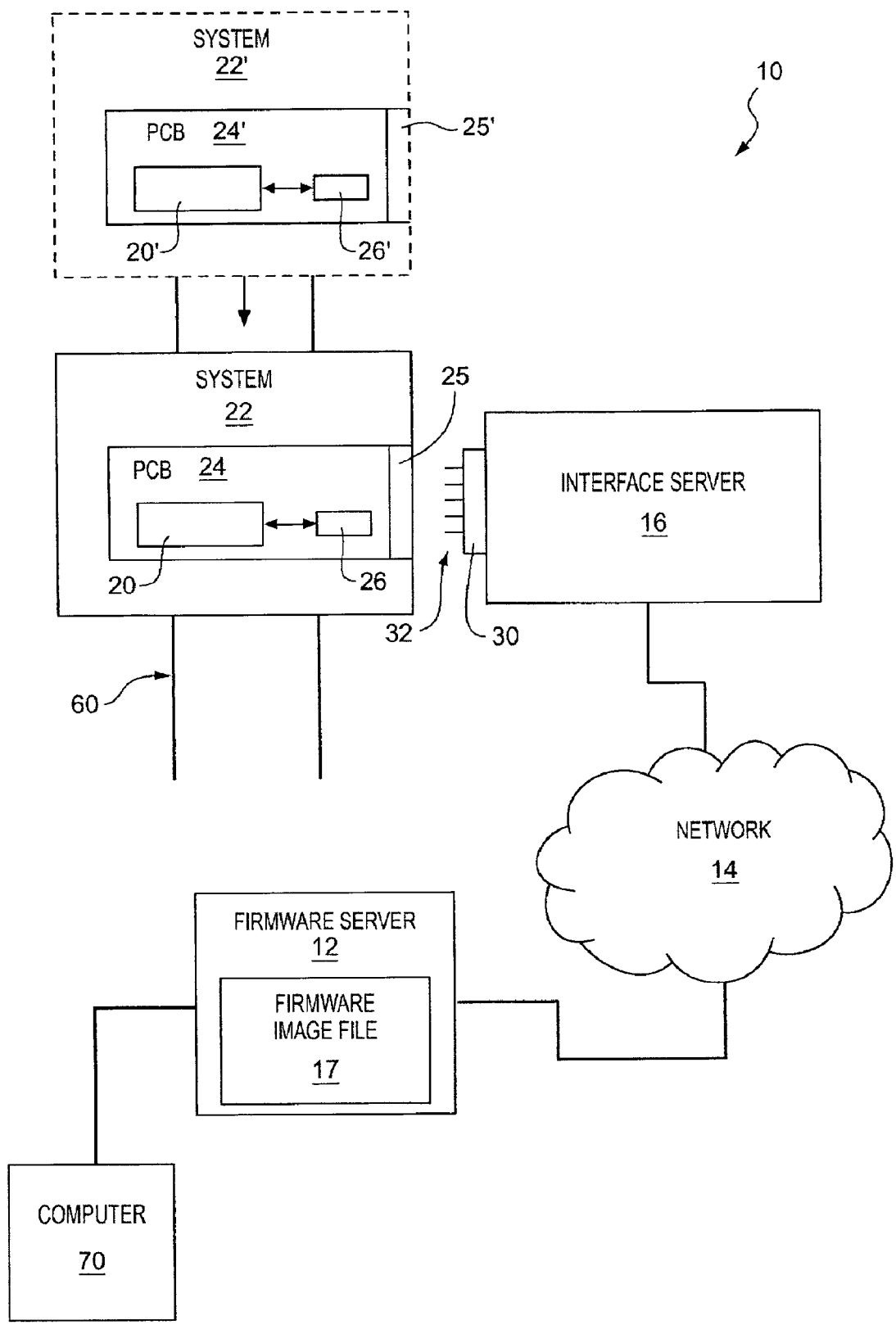
FIG. 1 shows a system constructed according to the invention for programming one or more programmable parts, in accord with the invention.

FIG. 1 shows a system 10 constructed according to the invention. System 10 includes a firmware server 12 connected by a network 14 to an interface server 16. Network 14 may for example be the Internet, a LAN or WAN, or combinations thereof. Firmware server 12 stores a firmware image file 17; firmware image file 17 is used to program a programmable part 20 for use within a system 22. Communications between server 12 across network 14 and to interface server 16 may be secure link enabled by a virtual private network or other private link.

System 22 may for example be a product incorporating a printed circuit board 24 (PCB 24). Programmable part 20 may and preferably is integrated with printed circuit board 24. Programmable part 20 may for example be a FPGA, PLD, EEPROM or other programmable logic; programmable part 20 may alternatively be a programmable processor like a PIC processor from MICRO CHIP, a 68HC05 family processor from MOTOROLA, a 68HC11 processor from MOTOROLA, and a 8051 or 8096 processors from INTEL.

Interface server 16 interfaces with programmable part 20 to program part 20 according to image file 17. In the preferred embodiment, interface server 16 has a connector 30 to physically connect with a connector 25 of PCB 24, to program part 20. Accordingly, connector 30 has a plurality of pins 32 arranged in a programming configuration to couple with PCB 24.

Those skilled in the art should appreciate that system 10 may program part 20 with alternative connections to connector 30. For example, connector 30 may connect directly to part 20, in a pin-specific configuration of pins 32, to program part 20. Alternatively, connector 30 may connect with system 22—and specifically by connection of pins 32 to internal signal lines 34 connected to part 20—to equivalently program part 20 in the appropriate programming configuration.

It should therefore be clear that system 10 is illustrative to show one or more possible configurations for programming part 20. Specifically, in one configuration, interface server 16 connects directly to PCB 24 by connector pins 32 of connector 30 to program part 20 within PCB 24. In a second configuration, interface server 16 couples to system 22 by connector pins 32 coupled to signal lines 34; signal lines 34 thus connect in the right programming configuration to PCB 24. In the third configuration, interface server 16 couples directly to part 20 via its connector and pins 30, 32, respectively. In this third configuration, therefore, PCB 24 and system 22 are not part of the process and are not, thus, included during the step of programming part 20.

System 10 preferably operates within a manufacturing process with many parts 20 programmed in sequence (or to some extent concurrently, if multiple servers 16 are within the manufacturing process). FIG. 1 thus illustratively shows system 10 with a robotics link 60 that shuttles sequential parts 20 for programming by interface server 16. Depending on the configuration, link 60 may sequentially shuttle parts 20 for programming, or PCBs 24 with parts 20 for programming, or systems 22 with PCBs and parts 24, 20, for programming. FIG. 1 shows a second system 22', second PCB 24' and part 20' illustrating a second of the many parts 20 programmed in sequence.

In one embodiment, PCB 24 includes a serial or memory device 26 used to poll and/or capture firmware image file 17 from server 16 automatically.

Firmware image file 17 is updated by overwriting a similarly named image file to firmware server 12. An engineer desiring to update image file 17 to a newer revision for programming part 20 can thus update part 20 by communicating the later revision firmware from his computer 70 connected to firmware server 12. Updating the firmware 17 in this manner is "seamless" to the programming process at the location of interface server 16; that is, continued programming of parts 20 may occur without special configuration or communication indicating the newer revision.

Figure 2:
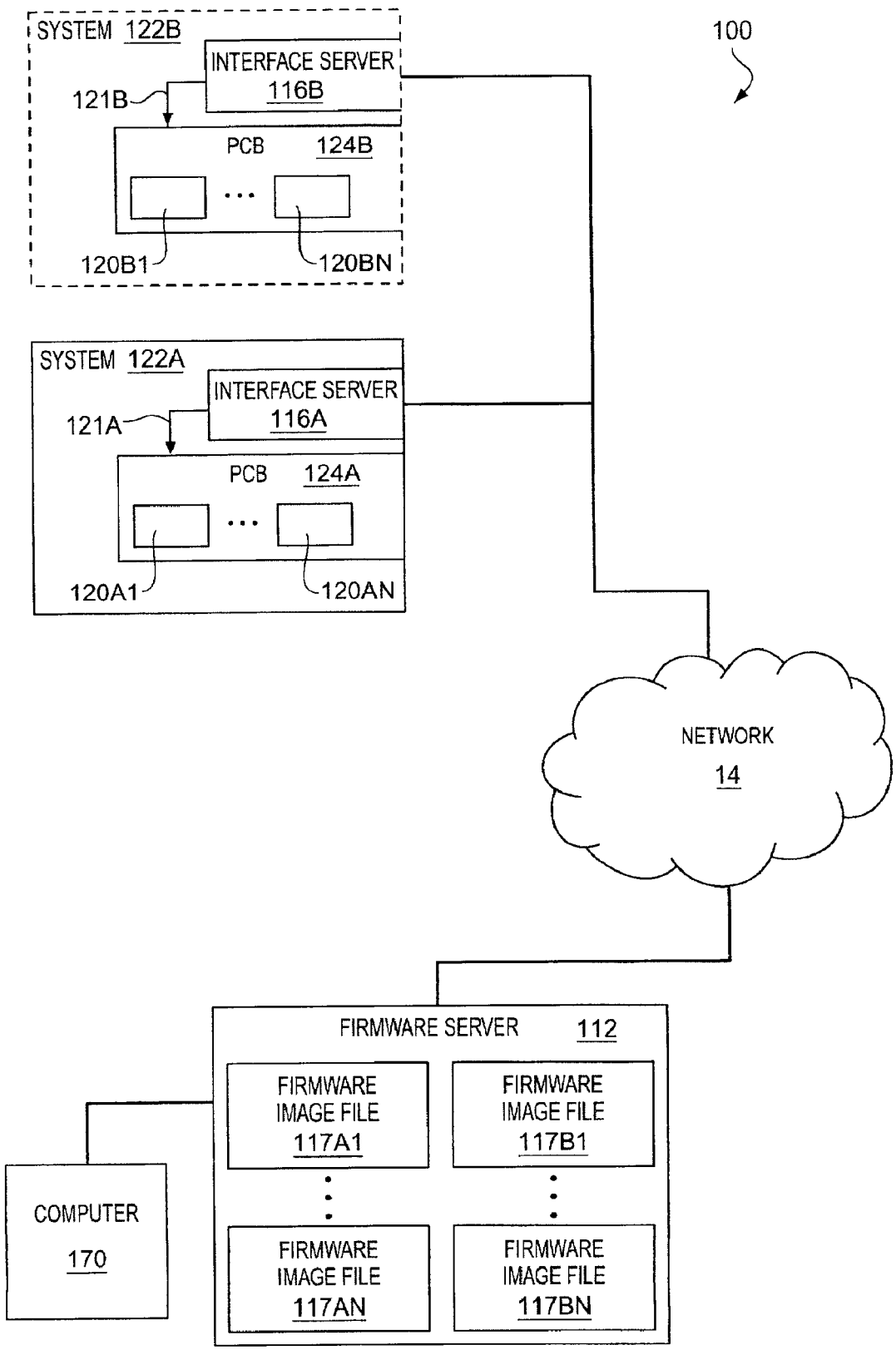
FIG. 2 shows another system of the invention for programming programmable parts in accord with the invention.

Interface server 16 may be, and preferably is, integral with system 22; in addition, the invention may program more than a single part within a PCB. FIG. 2 illustrates this preferred embodiment in a system 100 of the invention.

System 100 includes a firmware server 112 connected by a network 114 to one or more interface servers 116. System 100 is shown to connect to two interface servers 116A, 116B simultaneously; system 100 may further connect to additional or fewer servers 116, as a matter of design choice.

Network 114 may for example be the Internet, a LAN or WAN, or combinations thereof. Secure communications between servers 116 and firmware server 112 may occur through one of known techniques, as a matter of design choice. Firmware server 112 stores a series of firmware image files 17A1 . . . 17AN, 117B1 . . . 117BN; firmware image files 117 are used to program a corresponding number of programmable parts 20A1 . . . 120AN, 120B1 . . . 120BN. The number of files 117 and corresponding parts 120 is a matter of design choice; those skilled in the art should appreciate that system 100 may for example program one or more parts 120 without departing from the scope of the invention.

Systems 122 may for example be a product incorporating a printed circuit board 124. System 100 is shown to include two systems 122A, 122B, each with a corresponding interface server 116A, 116B and boards 124A, 124B; however system 100 may further include additional or fewer systems 122 as a matter of design choice.

Programmable parts 120 may and preferably are integrated with printed circuit boards 124. Programmable parts 120 may for example be a FPGA, PLD, EEPROM or other programmable logic; programmable parts 120 may alternatively be a programmable processor.

Interface servers 116 interface with programmable parts 120 to program parts 120 according to image files 117. In the preferred embodiment, interface server 116 resides within system 122 and connects to program parts 120 via one or more signal lines 121 (for example, server 116A connects to parts 120A within system 122A; server 116B connects to parts 120B within system 122B).

System 100 preferably operates within a manufacturing process with many parts 120 programmed concurrently. Firmware image files 117 may be updated by overwriting a similarly named image file to firmware server 112. An engineer desiring to update one or more of image files 117 to a newer revision for one or more of programming parts 120 may thus update the parts by communicating the later revision firmware from his computer 170 connected to firmware server 112. Updating firmware 117 in this manner is "seamless" to the programming process at the location of interface server 116; that is, continued programming of parts 120 may occur without special configuration or communication indicating the newer revision.

Those skilled in the art should appreciate that interface servers 116 may embody built-in parts and/or components within systems 122, or within boards 124, to accomplish the same function, without departing from the scope of the invention. Specifically, interface servers 116 may be, or may include, smart components or processors coupled with printed circuit boards 124; such smart components or processors then directly communicate with the network firmware server 112.

The inventions of FIG. 1 and FIG. 2 have several advantages. First, systems 10, 100 are very fast as compared to prior art methods for updating firmware for programmable parts, such as those using the ICT. Second, a single firmware image is preferably used throughout the manufacturing life cycle of system 22, 122; this eliminates the overhead and tracking of revisions for various firmware upgrades to parts. Third, the process of updating firmware to programmable parts is less disruptive to the manufacturing process, increasing product throughput and reducing error rates.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A method of implementing firmware updates to a programmable part within a printed circuit board, comprising the steps of:
    creating an image file of firmware used to program the part;
    storing the image file at a firmware server;
    integrating the programmable part with the printed circuit board;
    networking the printed circuit board with the firmware server; and
    automatically polling the firmware server to download the firmware to program the programmable part.

2. The method of claim 1, wherein the step of automatically polling comprises downloading the firmware to the printed circuit board.

3. The method of claim 1, further comprising the step of integrating a serial chip with the printed circuit board, the serial chip polling the firmware server to download the firmware, the programmable part having bootstrap software to download the firmware from the serial chip to the programmable part.

4. The method of claim 1, the step of networking comprising utilizing one or more of the Internet, LAN, WAN or mixtures thereof.

5. The method of claim 1, further comprising updating the image file at the firmware server, wherein subsequent download of the image file to a programmable part is seamless to the updated firmware.

6. The method of claim 1, wherein the step of networking comprises utilizing a first interface server local to the programmable part and remote from the firmware server.

7. The method of claim 6, wherein the step of utilizing a first interface server comprises coupling the printed circuit board to a connector of the first interface server.

8. The method of claim 1, wherein the step of networking comprises networking the firmware server with the printed circuit board.

9. The method of claim 7, further comprising decoupling the printed circuit board from the first interface server.

10. The method of claim 1, further comprising utilizing bootstrap software associated with the programmable part to program the programmable part.

11. A system for programming programmable parts in a manufacturing line, comprising:
    a firmware server connected to a network for storing one or more firmware image files;
    one or more interface servers with the manufacturing line and connected to the network, for capturing at least one of the firmware image files from the firmware server; and
    one or more printed circuit boards having one or more programmable parts and connected with at least one of the interface servers, the printed circuit boards polling the firmware server to download at least one of the firmware image files and program at least one of the programmable parts with firmware corresponding to the at least one firmware image file.

12. The system of claim 11, wherein one of the interface servers sequentially connects with a plurality of printed circuit boards.

13. The system of claim 12, the one interface server comprising a connector for physically coupling with the plurality of circuit boards.

14. The system of claim 13, the connector having one or more pins that interface in a programming configuration with pads or pins on the plurality of printed circuit boards to program the programmable parts.

15. The method of claim 11, the at least one programmable part utilizing bootstrap software to program the at least one programmable part.

16. A method of implementing firmware updates to programmable parts within one or more circuit boards, comprising the steps of:

creating one or more image files of firmware used to program the parts;

storing the image files at a firmware server; and polling the firmware server such that at least one of the image files downloads to at least one of the circuit boards for programming at least one of the programmable parts.

17. The method of claim 16, the step of polling comprising utilizing one or more of the Internet, LAN, WAN or mixtures thereof.

18. The method of claim 16, further comprising updating at least one of the firmware image files at the firmware server, wherein subsequent download of the one firmware image file to one or more of the programmable parts is seamless to the updated firmware.

19. The method of claim 16, wherein the step of polling comprises utilizing one or more interface servers remote from the firmware server.

20. The method of claim 19, wherein the step of utilizing the interface servers comprises coupling one or more of the printed circuit boards to a connector of at least one of the interface servers.

21. The method of claim 19, wherein the step of polling comprises simultaneously networking a plurality of interface servers to the firmware server.

22. The method of claim 19, wherein the step of utilizing the interface servers comprises networking devices within one or more of the circuit boards to a network coupled to the firmware server.

23. The method of claim 22, further comprising the step of concurrently programming a plurality of programmable parts on one or more of the circuit boards through downloading, over the network, a plurality of the image files to the plurality of programmable parts.

* * * * *